United States Patent
Matsunaga et al.

(10) Patent No.: US 11,040,245 B2
(45) Date of Patent: Jun. 22, 2021

(54) ANALYSIS APPARATUS, RECORDING MEDIUM, AND ANALYSIS METHOD

(71) Applicant: SONY CORPORATION, Tokyo (JP)

(72) Inventors: Hideyuki Matsunaga, Kanagawa (JP); Kosei Yamashita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 213 days.

(21) Appl. No.: 15/027,615

(22) PCT Filed: Nov. 25, 2014

(86) PCT No.: PCT/JP2014/005895
§ 371 (c)(1),
(2) Date: Apr. 6, 2016

(87) PCT Pub. No.: WO2015/097983
PCT Pub. Date: Jul. 2, 2015

(65) Prior Publication Data
US 2016/0243401 A1     Aug. 25, 2016

(30) Foreign Application Priority Data

Dec. 25, 2013  (JP) .............................. JP2013-267759
Dec. 26, 2013  (JP) .............................. JP2013-269932

(51) Int. Cl.
*A63B 24/00*    (2006.01)
*G01L 5/04*     (2006.01)
(Continued)

(52) U.S. Cl.
CPC .......... *A63B 24/0062* (2013.01); *G01L 5/042* (2013.01); *G06K 9/00342* (2013.01);
(Continued)

(58) Field of Classification Search
CPC . G01L 5/042; G06K 9/00342; G06K 9/00543
See application file for complete search history.

(56) References Cited

U.S. PATENT DOCUMENTS 4,055,999 A * 11/1977 Cope .................... A63B 51/005
                                                          73/862.452
5,007,294 A *  4/1991 Matjasic .............. A63B 51/005
                                                          73/862.41
(Continued)

FOREIGN PATENT DOCUMENTS

EP      0 586 832 A1    3/1994
EP      1 177 816 A1    2/2002
(Continued)

OTHER PUBLICATIONS

Tennis Warehouse University, Racquet Vibration Frequency Ranking, Apr. 30, 2013 (Year: 2013).*
(Continued)

*Primary Examiner* — Kyle R Quigley
(74) *Attorney, Agent, or Firm* — Xsensus LLP

(57) ABSTRACT

A system to analyze vibration data includes circuitry that receives the vibration data, which is generated by a sensor that senses vibration of an object. The circuitry also analyzes the vibration data based on stored predetermined vibration data, and determines a characteristic of the object based on the analysis.

21 Claims, 14 Drawing Sheets

(51) Int. Cl.
*G06K 9/00* (2006.01)
*H04M 1/72412* (2021.01)

(52) U.S. Cl.
CPC ..... *G06K 9/00543* (2013.01); *H04M 1/72412* (2021.01); *H04M 2250/12* (2013.01)

(56) References Cited

U.S. PATENT DOCUMENTS

| | | | |
|---|---|---|---|
| 5,374,057 A | 12/1994 | Lai et al. | |
| 5,406,827 A * | 4/1995 | Boyden | A63B 51/005 73/1.82 |
| 5,796,005 A * | 8/1998 | Frolow | G01H 5/00 200/61.51 |
| 6,868,348 B1 | 3/2005 | Stoutenburg et al. | |
| 8,696,482 B1 * | 4/2014 | Pedenko | A63B 69/3632 473/221 |
| 2004/0152544 A1 | 8/2004 | Lammer | |
| 2005/0043124 A1 * | 2/2005 | Takeuchi | A63B 49/10 473/535 |
| 2006/0079354 A1 | 4/2006 | Lammer | |
| 2008/0190202 A1 * | 8/2008 | Kulach | A63B 24/0062 73/514.01 |
| 2011/0183787 A1 * | 7/2011 | Schwenger | A63B 49/00 473/553 |
| 2013/0097276 A1 * | 4/2013 | Sridhar | G06F 9/5072 709/217 |
| 2013/0319113 A1 | 12/2013 | Mizuta | |
| 2014/0141907 A1 | 5/2014 | Schwenger et al. | |
| 2014/0290332 A1 | 10/2014 | Yamashita et al. | |
| 2015/0007634 A1 * | 1/2015 | Wallace | G01N 3/30 73/12.09 |

FOREIGN PATENT DOCUMENTS

| | | |
|---|---|---|
| JP | 59-194761 A | 11/1984 |
| JP | 2006-278698 A | 10/2006 |
| JP | 2011-14060 A | 1/2011 |
| WO | 01/31309 A2 | 5/2001 |
| WO | 2011/036567 A2 | 3/2011 |
| WO | 2013/069447 A1 | 5/2013 |

OTHER PUBLICATIONS

Office Action dated Dec. 20, 2016 in Japanese Patent Application No. 2013-269932.
International Search Report dated Mar. 23, 2015, in PCT/JP2014/005895 Filed Nov. 25, 2014.

* cited by examiner

[Fig. 1]
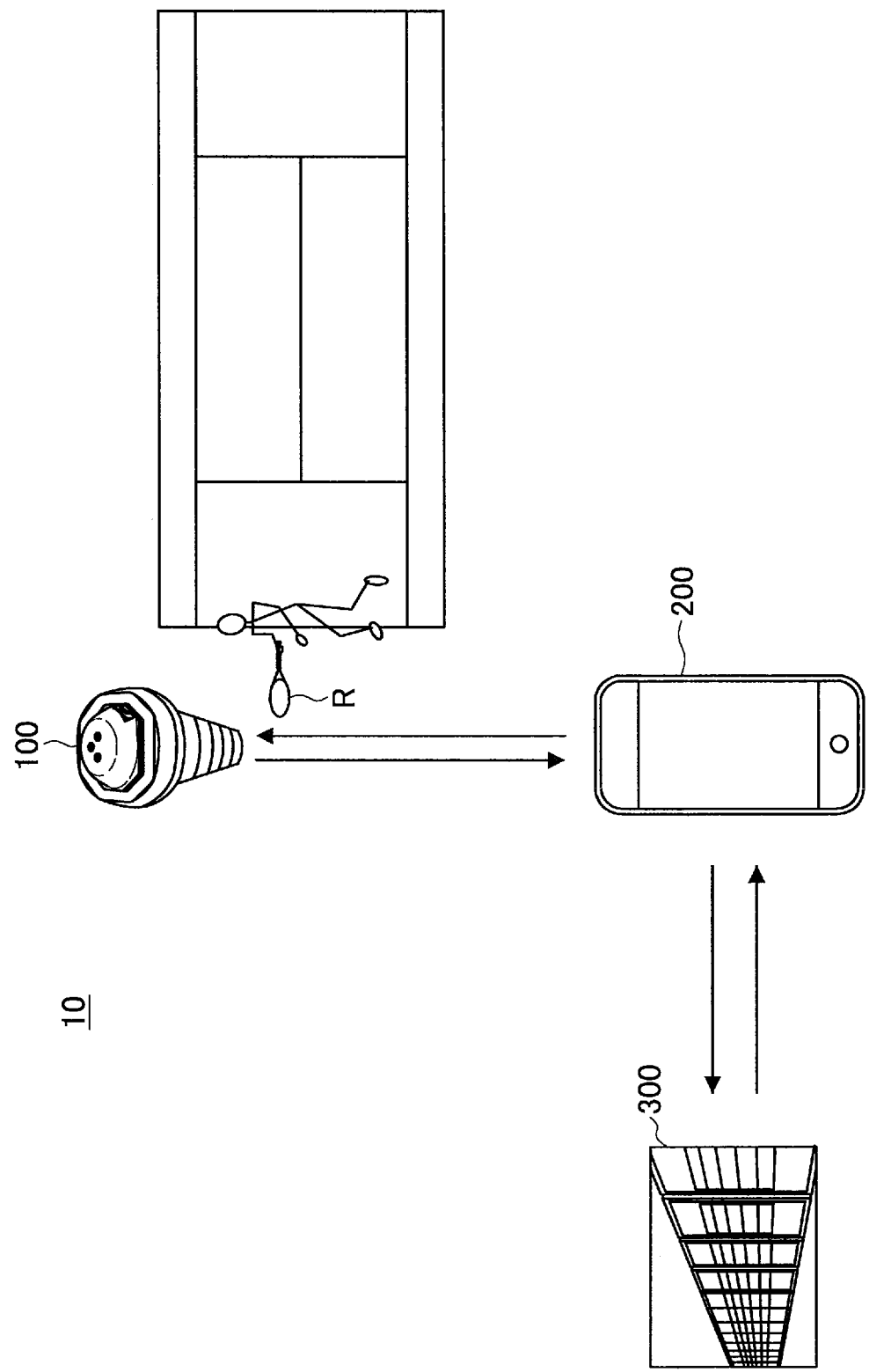

[Fig. 2]
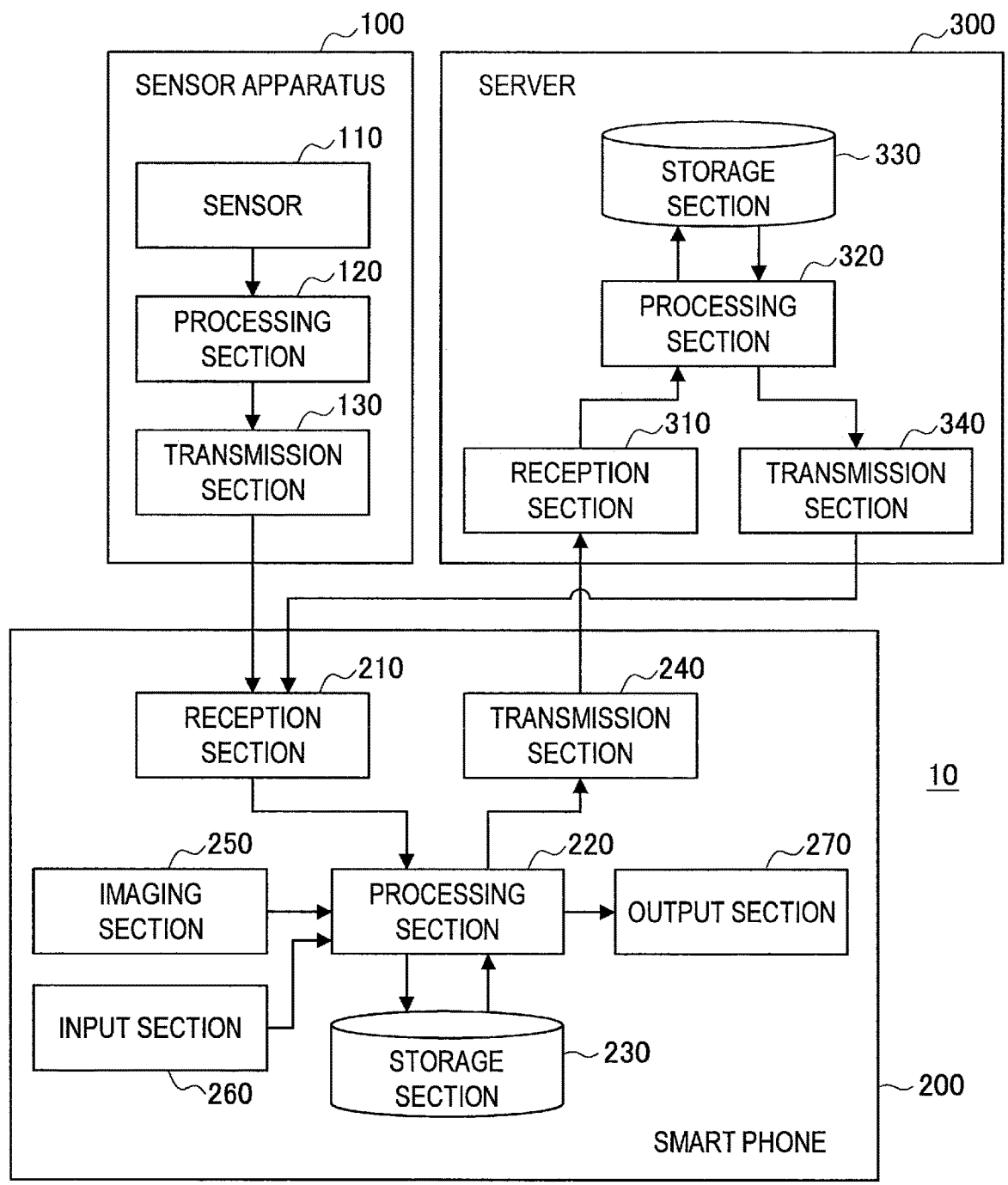

[Fig. 3]
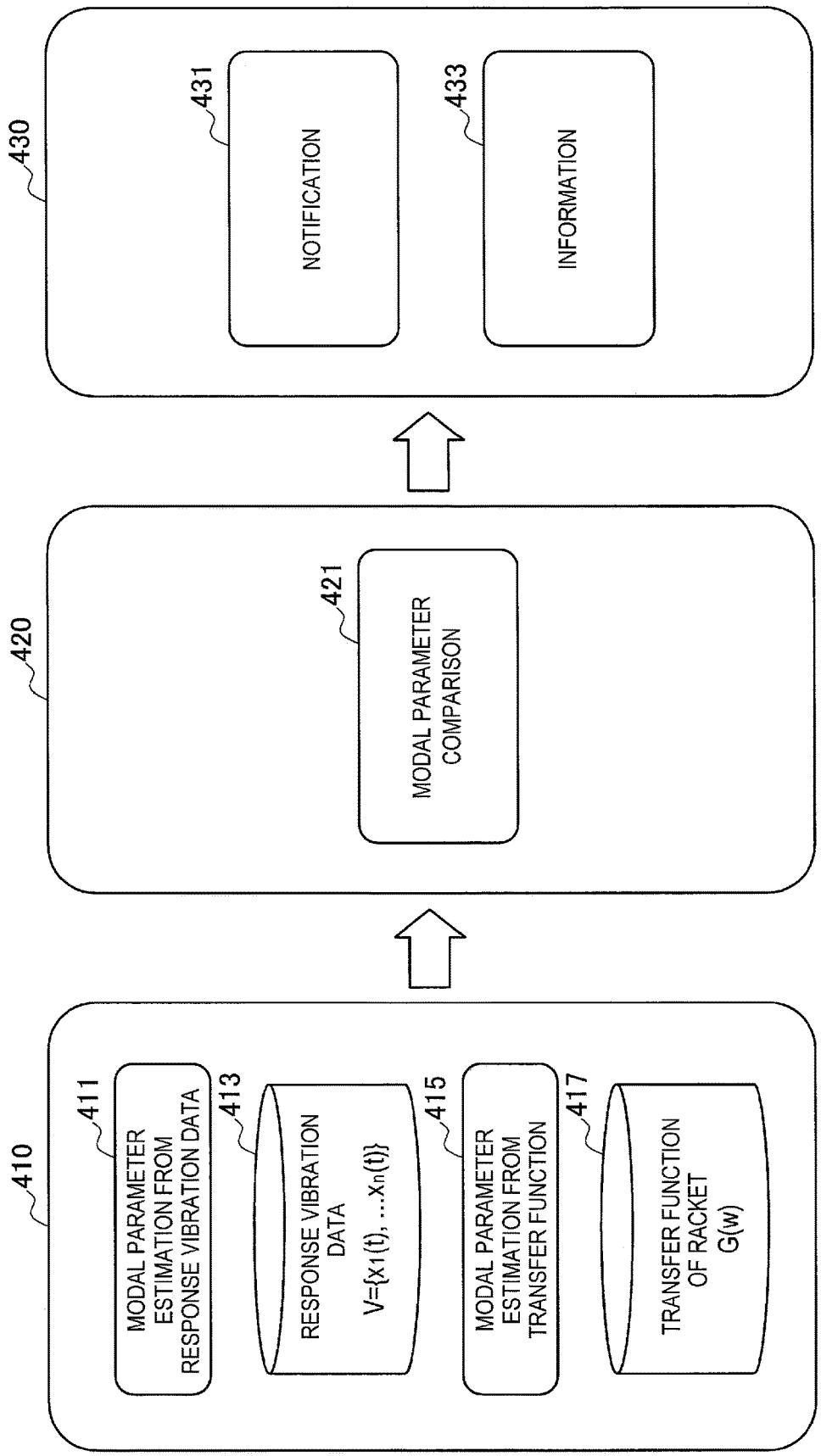

[Fig. 4]
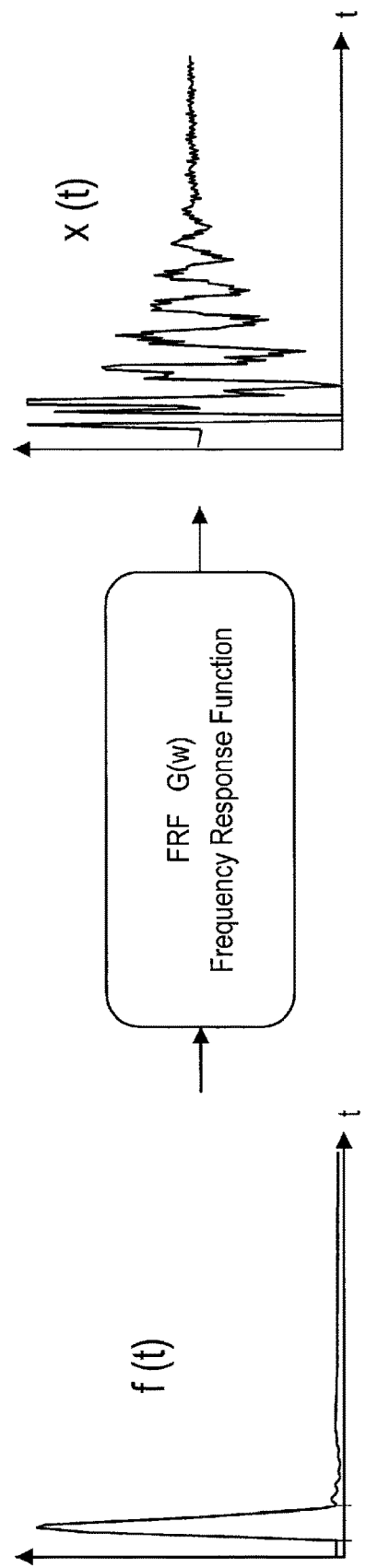

[Fig. 5]
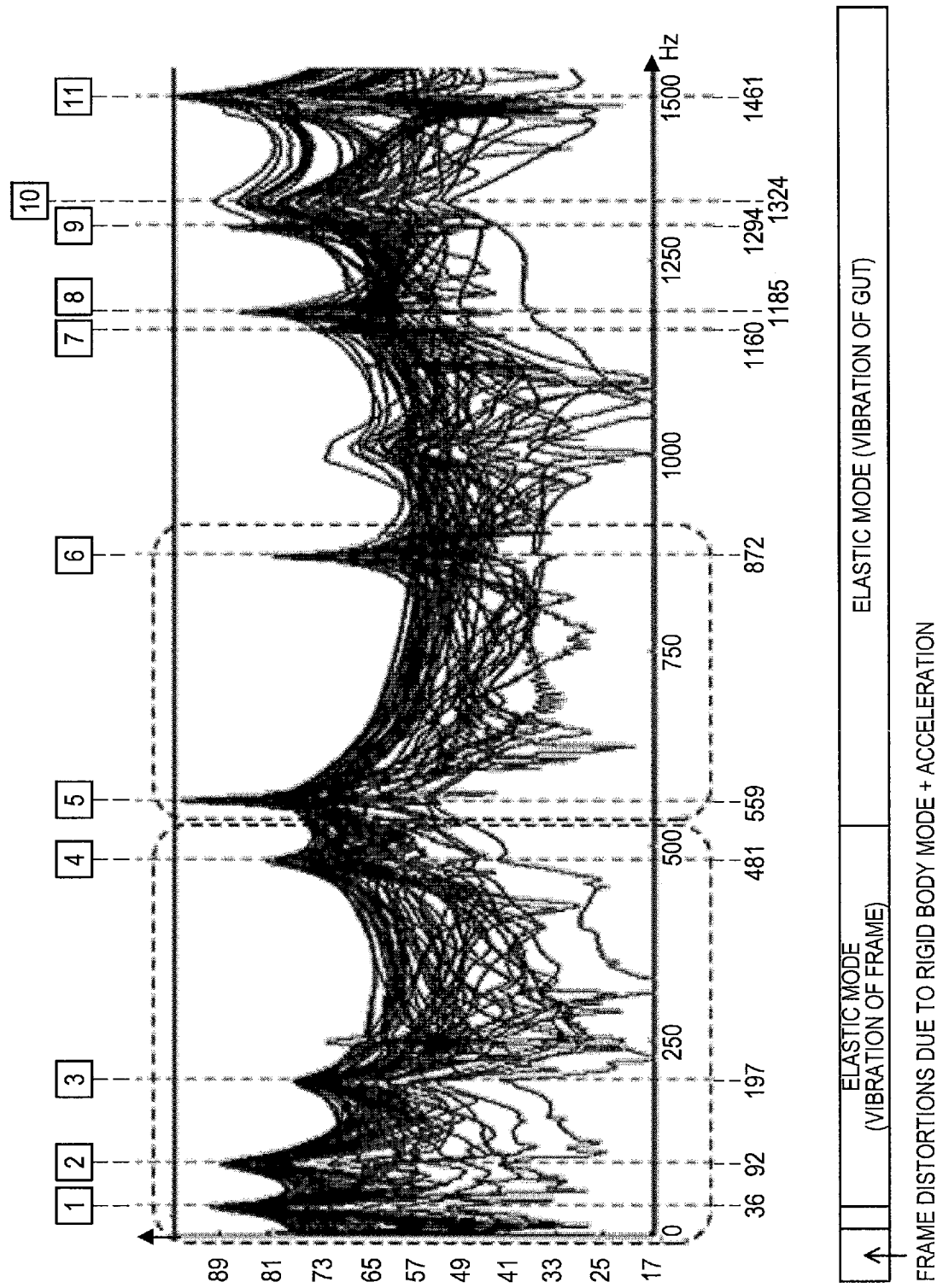

[Fig. 6]
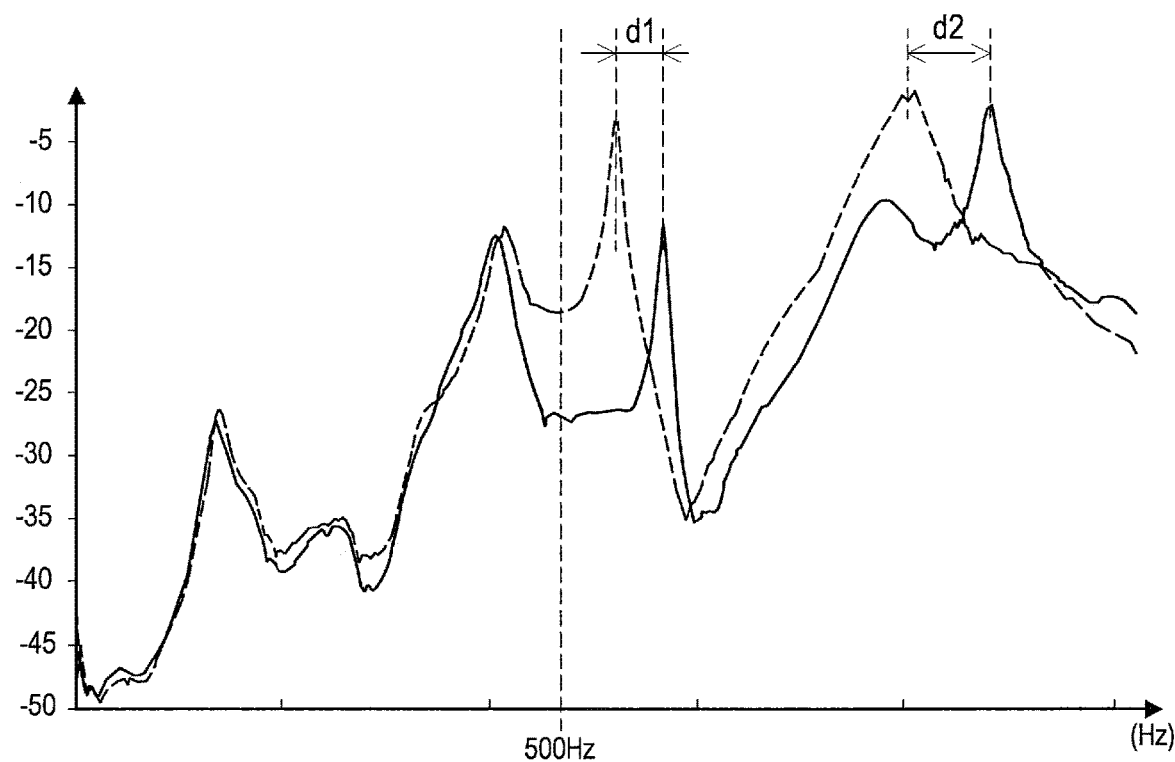

[Fig. 7]
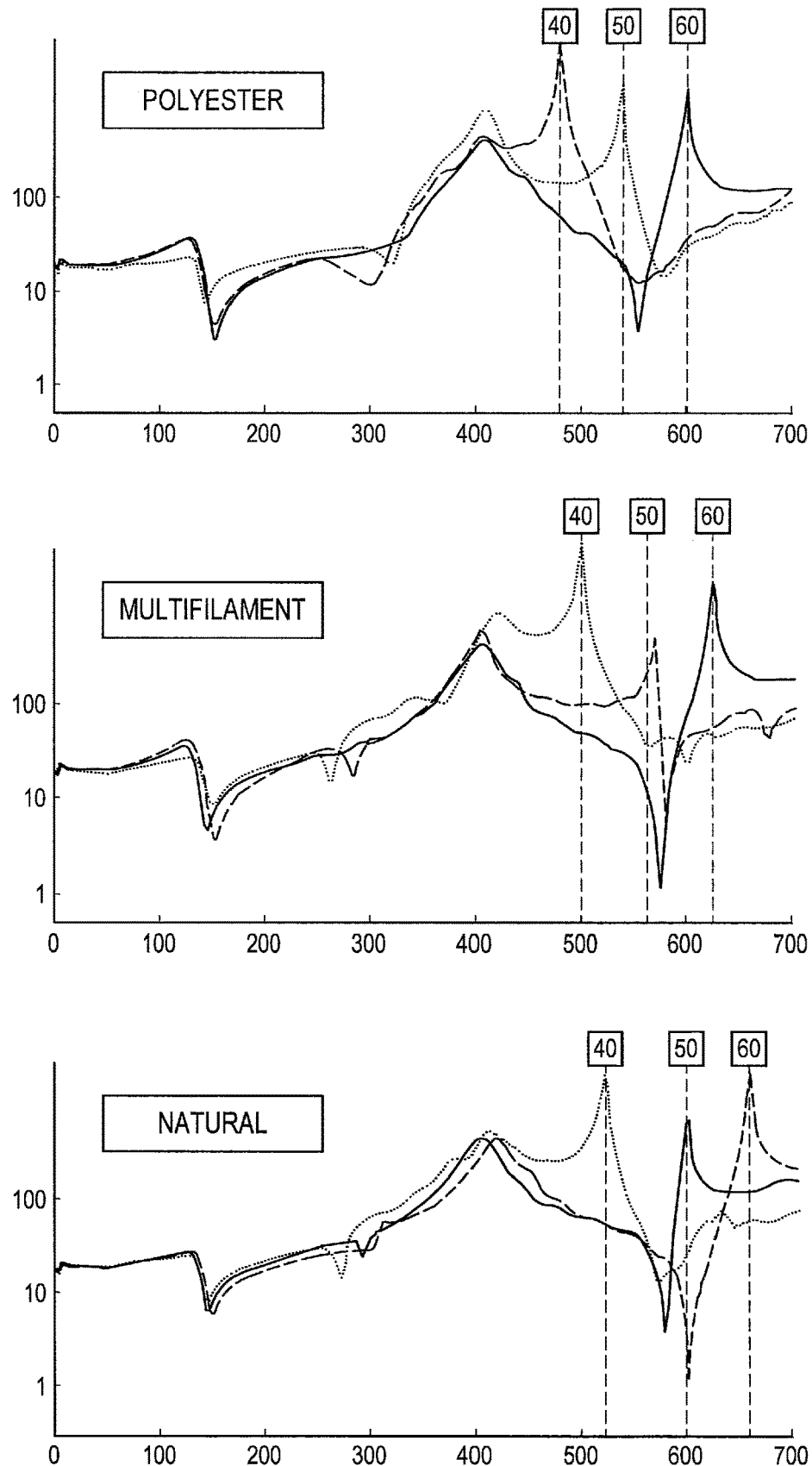

[Fig. 8]
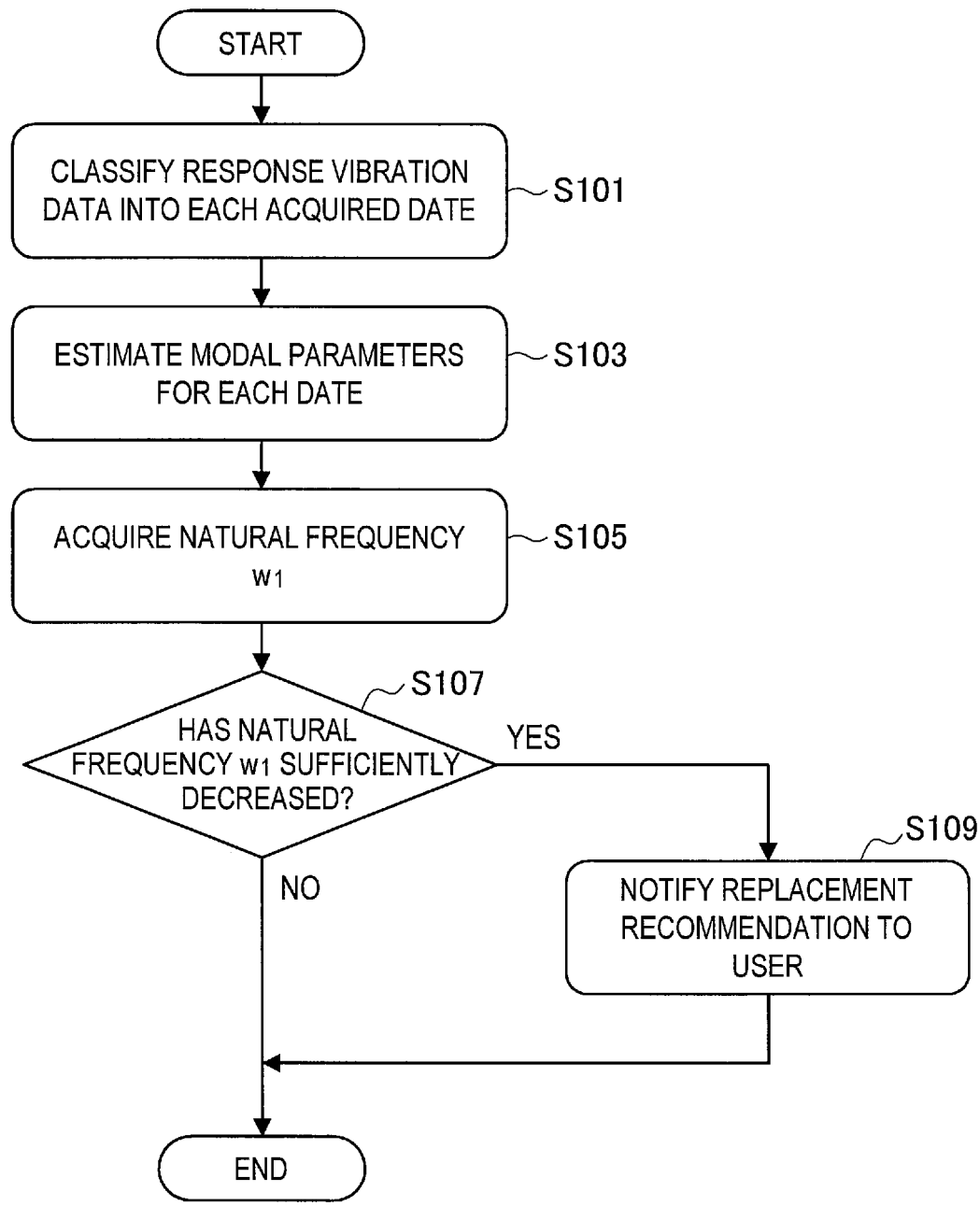

[Fig. 9]
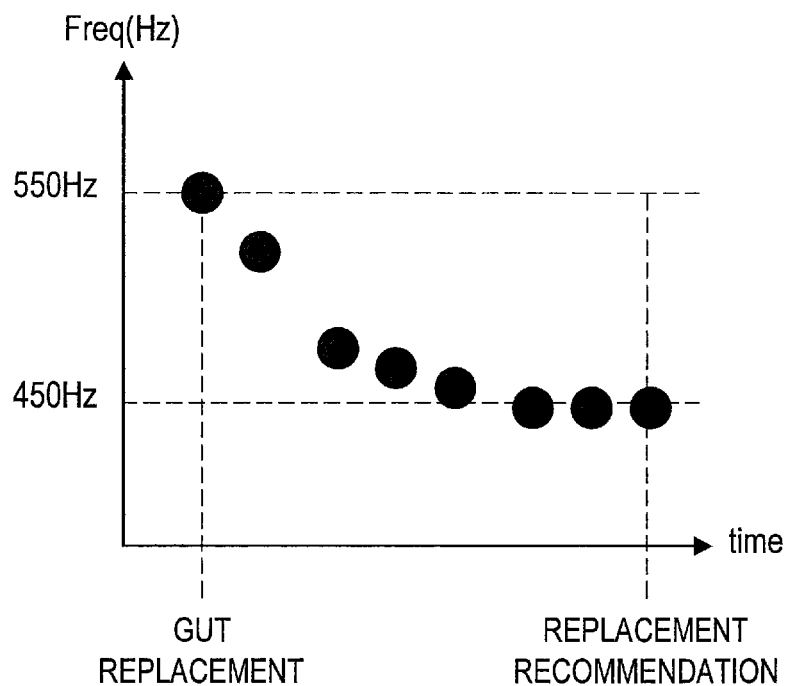

[Fig. 10]
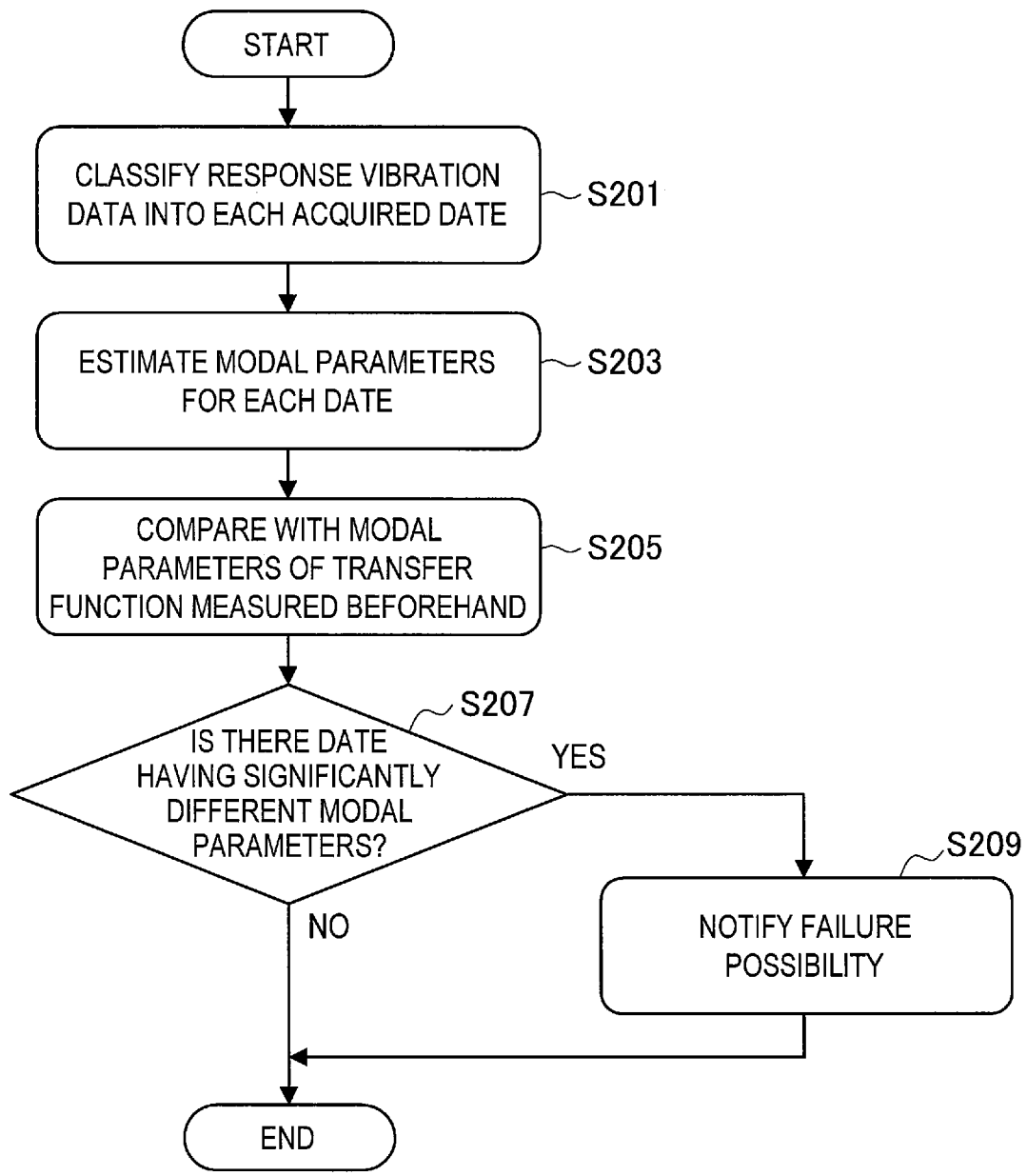

[Fig. 11]
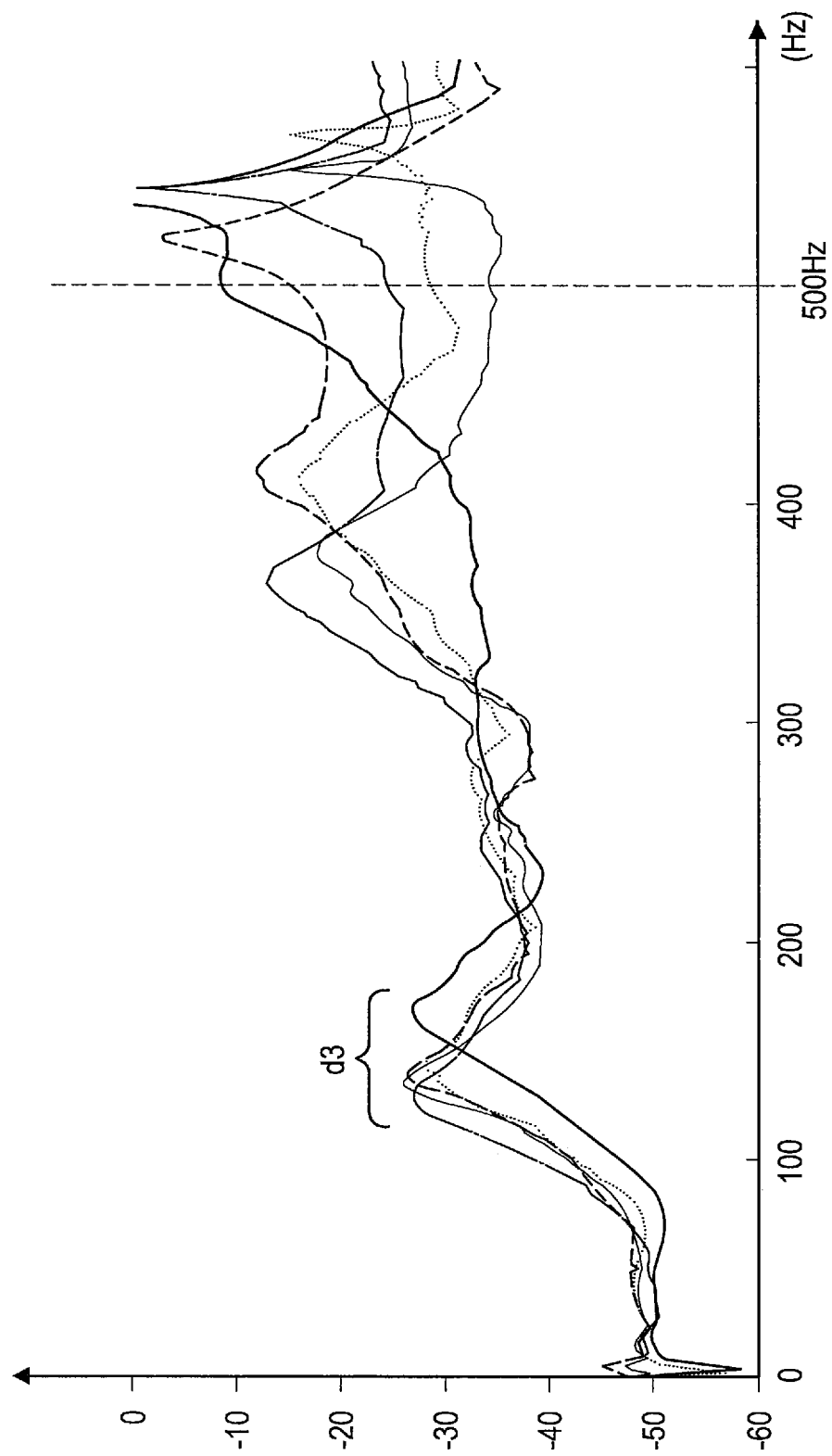

[Fig. 12]
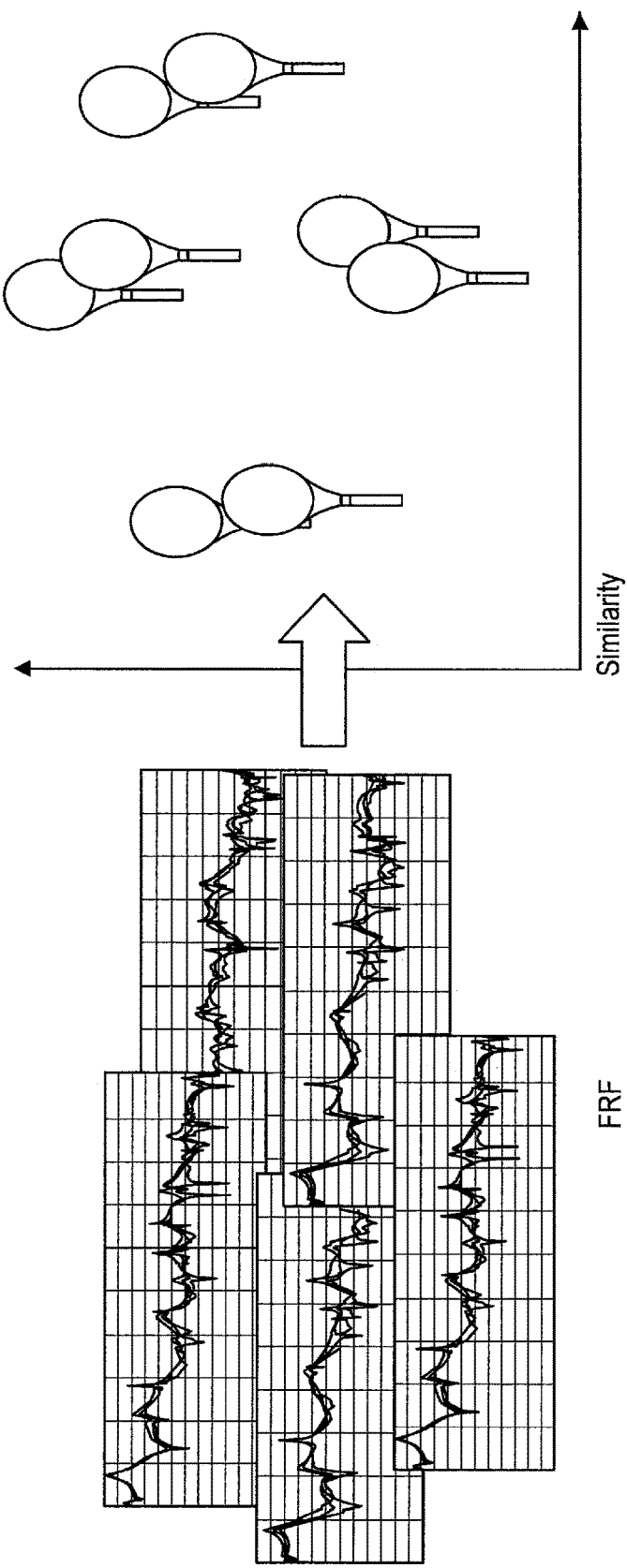

[Fig. 13]
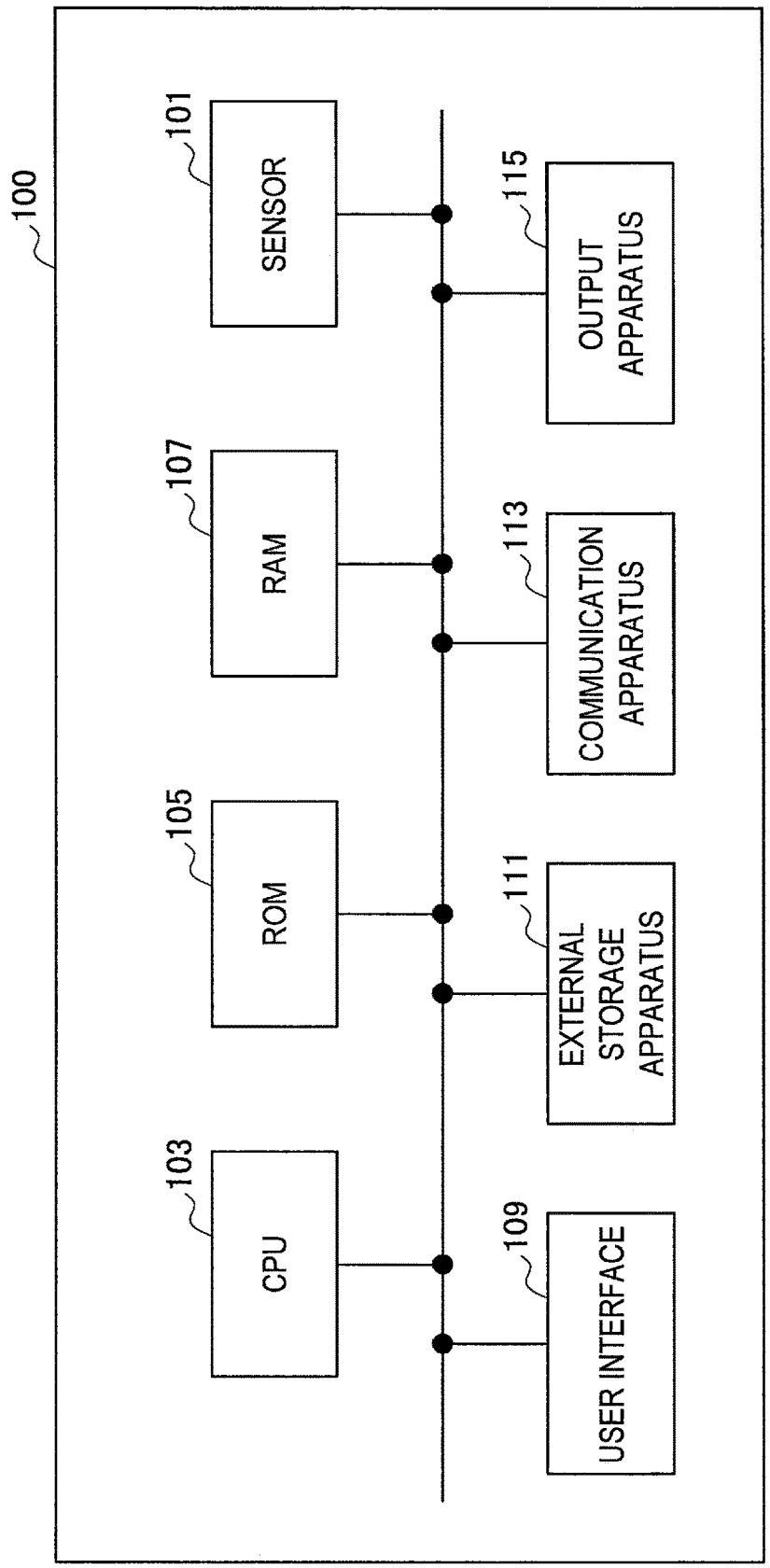

[Fig. 14]
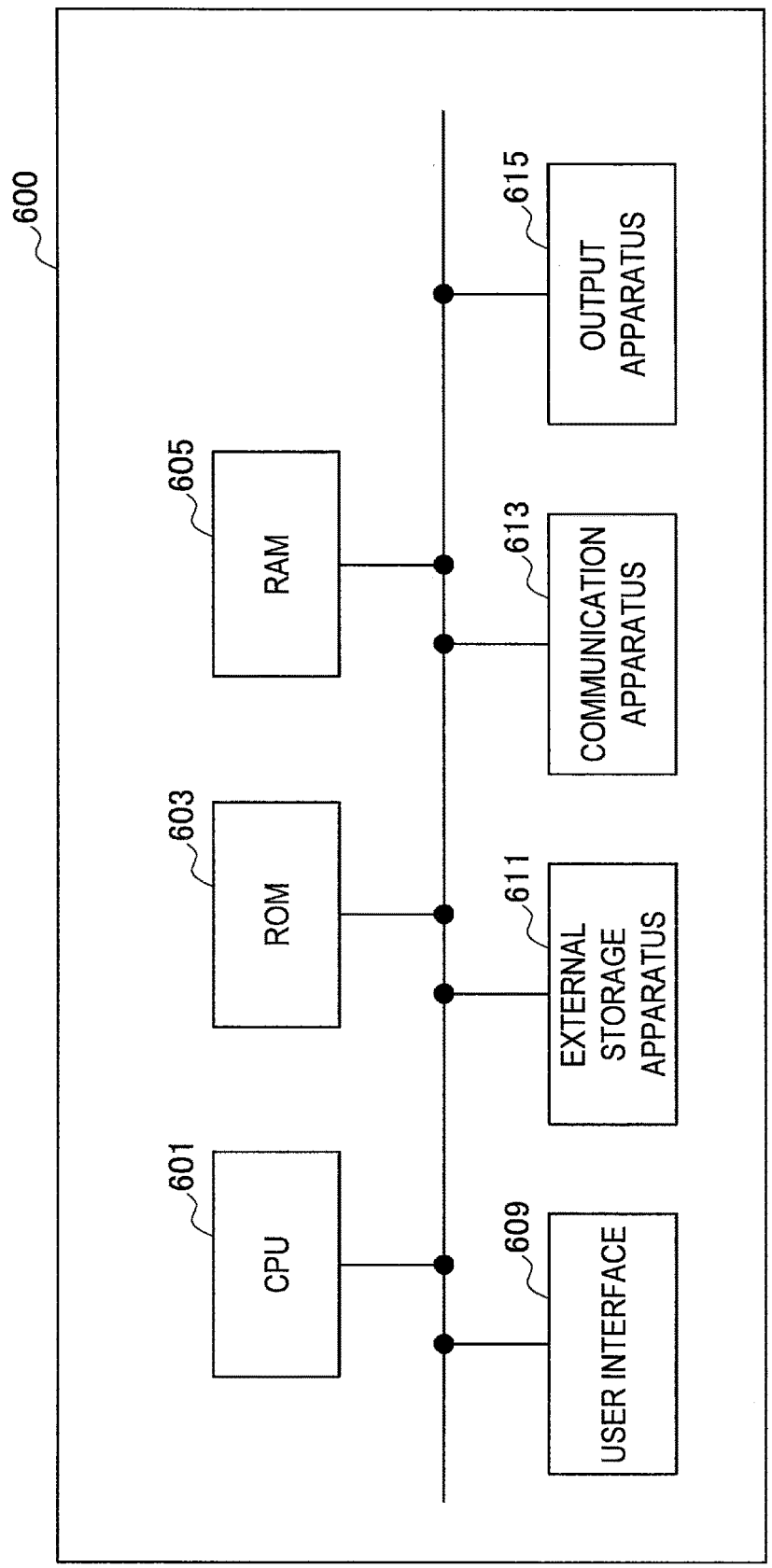

ANALYSIS APPARATUS, RECORDING MEDIUM, AND ANALYSIS METHOD

CROSS REFERENCE TO RELATED APPLICATIONS

This application claims the benefit of Japanese Priority Patent Application JP 2013-267759 filed Dec. 25, 2013, and Japanese Priority Patent Application JP 2013-269932 filed Dec. 26, 2013, the entire contents of each of which are incorporated herein by reference.

TECHNICAL FIELD

The present disclosure relates to an analysis apparatus, a recording medium, and an analysis method.

BACKGROUND ART

Up until now, many technologies have been developed which assist the movements of a user, by using sensing or analysis. As such technology, for example, in sports where a ball is hit by using a hitting tool, such as tennis, badminton, table tennis, golf or baseball, the frequency at which a ball is hit by the hitting tool and the position at which the ball is hit are detected, and these are presented as information to a user. As an example of such technology, PTL 1 discloses technology, for example, which arranges sensors on a hitting surface of a tennis racket and the surroundings of this, detects where the ball hits the hitting surface, and notifies the frequency and position of this to a user.

CITATION LIST

Patent Literature

PTL 1: JP S59-194761A

SUMMARY

Technical Problem

In the technology disclosed in PTL 1, a large number of sensors are arranged corresponding to each of the positions on the hitting surface of the tennis racket. In this way, it is possible to detect not only the frequency at which the ball has hit the hitting surface, but also where on the hitting surface the ball has hit. However, such a large number of sensors will take time to be installed after a user has purchased a hitting tool. While hitting tools may be sold which have sensors built-in beforehand, the price of the hitting tool will increase, and it will be difficult for a user to replace the hitting tool.

Further, since the hitting tool may repeatedly hit a ball, or may be dropped during play, the state of the parts, joints or the like will constantly change. However, since a user is continuously using the hitting tool, it will be difficult to notice a change in the state, in particular, in the case where the state of the hitting tool changes little by little by being repeatedly used. Therefore, while it is desirable to detect a state change of the hitting tool by some type of sensing, data such as that acquired in the technology of PTL 1, for example, immediately shows the frequency and position at which the ball hits the hitting surface, and therefore it will be difficult to use this as a clue for estimating the state of the hitting tool.

Accordingly, the present disclosure proposes a new and improved analysis apparatus, recording medium and analysis method capable of acquiring data for evaluating a hitting tool with a simpler configuration.

Solution to Problem

In an exemplary aspect, a system to analyze vibration data includes circuitry that receives the vibration data, which is generated by a sensor that senses vibration of an object. The circuitry also analyzes the vibration data based on stored predetermined vibration data, and determines a characteristic of the object based on the analysis.

In another exemplary aspect, a method of analyzing vibration data includes receiving the vibration data, which is generated by a sensor that senses vibration of an object, and analyzing, with circuitry, the vibration data based on stored predetermined vibration data. The method also includes determining, with the circuitry, a characteristic of the object based on the analysis.

In a further exemplary aspect, a non-transitory computer-readable medium encoded with computer-readable instructions thereon, the computer-readable instructions when executed by a computer cause the computer to perform a method that includes receiving the vibration data, which is generated by a sensor that senses vibration of an object. The method also includes analyzing the vibration data based on stored predetermined vibration data, and determining a characteristic of the object based on the analysis.

Advantageous Effects of Invention

According to an embodiment of the present disclosure such as described above, data for evaluating a hitting tool with a simpler configuration can be acquired.

Note that, the above described effect is not necessarily limited, and any of the effects shown in the present disclosure, or other effects which can be understood from the present disclosure, may be accomplished along with the above described effect or instead of the above described effect.

BRIEF DESCRIPTION OF DRAWINGS

FIG. 1 is a figure which shows an example of a system configuration according to an embodiment of the present disclosure.

FIG. 2 is a block diagram which schematically shows an apparatus configuration of the system according to an embodiment of the present disclosure.

FIG. 3 is a figure which schematically shows a functional configuration of a processing section of the system according to an embodiment of the present disclosure.

FIG. 4 is a figure for describing a calculation of modal parameters from response vibration data in an embodiment of the present disclosure.

FIG. 5 is a figure which shows a relation between the natural frequency of a tennis racket and the state of the racket in an embodiment of the present disclosure.

FIG. 6 is a figure for describing a change of vibration characteristics due to differences in the tension of a gut in an embodiment of the present disclosure.

FIG. 7 is a figure which shows an example of a change of vibration characteristics due to differences in the tension of a gut in an embodiment of the present disclosure.

FIG. 8 is a flow chart which shows an example of a process for a gut replacement recommendation notification in an embodiment of the present disclosure.

FIG. 9 is a figure which shows an example of a change of natural frequency in accordance with a tension change of the gut in an embodiment of the present disclosure.

FIG. 10 is a flow chart which shows an example of a process for a failure possibility notification of the racket in an embodiment of the present disclosure.

FIG. 11 is a figure for describing a detection of the type of racket in an embodiment of the present disclosure.

FIG. 12 is a figure which shows an example of information presentation using the detection of the type of racket in an embodiment of the present disclosure.

FIG. 13 is a figure which shows an example of a hardware configuration of a sensor apparatus according to an embodiment of the present disclosure.

FIG. 14 is a figure which shows an example of a hardware configuration of an analysis apparatus according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. System configuration
2. Functional configuration
3. Example of evaluation of the hitting tool based on vibration characteristics
   3-1. Detection of loosening of the gut
   3-2. Detection of failure of the racket
   3-3. Detection of the type of racket
4. Hardware configurations
5. Conclusion (1. System Configuration)

FIG. 1 is a figure which shows an example of a system configuration according to an embodiment of the present disclosure. With reference to FIG. 1, the system 10 includes a sensor apparatus 100, a smart phone 200, and a server 300.

The sensor apparatus 100 is mounted on a tennis racket R. For example, the sensor apparatus 100 includes a vibration sensor, and detects vibrations generated in the racket R due to a ball colliding with the racket R. For example, vibration data acquired by the vibration sensor is transmitted to the smart phone 200 by wireless communication such as Bluetooth®. Further, the sensor apparatus 100 may include an acceleration sensor, an angular velocity sensor, a magnetic field sensor or the like (for example, a nine axis motion sensor), and may detect acceleration, angular velocity, inclination or the like of the racket R. The data acquired by these sensors is also transmitted to the smart phone 200 by wireless communication.

The smart phone 200 receives the data transmitted from the sensor apparatus 100. The smart phone 200 may execute an analysis process based on the received data. In this case, the smart phone 200 may output an analysis result to a user, and may upload the analysis data to the server 300. Alternatively, the smart phone 200 may forward the received data to the server 300. In this case, the smart phone 200 may receive a result of the analysis process executed by the server 300, and may output this result to the user.

The server 300 communicates with the smart phone 200 via a network, and receives an analysis result of the data acquired in the sensor apparatus 100 or the data of this. Further, the server 300 may receive data of an image captured from the smart phone 200. The server 300 retains an analysis result uploaded from the smart phone 200 or an analysis result calculated from the server 300 itself, and transmits this analysis result to a terminal apparatus used by the user such as the smart phone 200 as necessary. Further, the server 300 may transmit an analysis result to the terminal apparatus used by a user other than the user who has provided the analysis result or the data, and may enable sharing of the analysis result between the users.

FIG. 2 is a block diagram which schematically shows an apparatus configuration of the system according to an embodiment of the present disclosure. With reference to FIG. 2, the system 10 includes the sensor apparatus 100, the smart phone 200, and the server 300, and in addition, a hardware configuration example of an information processing apparatus which implements each apparatus will be described later.

The sensor apparatus 100 includes a sensor 110, a processing section 120, and a transmission section 130. For example, the sensor 110 includes a vibration sensor, an angular velocity sensor, an acceleration sensor and/or magnetic field sensor or the like (for example, a nine axis motion sensor). For example, the processing section 120 is implemented by a processor such as a CPU or the like, and processes data acquired by the sensor 110. For example, the processes by the processing section 120 may be pre-processes such as sampling or noise removal, or may include an analysis process. The transmission section 130 is implemented by a communication apparatus, and transmits data to the smart phone 200, for example, by using wireless communication such as Bluetooth®.

Here, the racket R is a hitting tool for hitting a ball in tennis. As described above, the present disclosure includes evaluating a first object, by comparing first vibration characteristics measured beforehand for the first object and second vibration characteristics shown by vibration data generated due to a second object colliding with the first object. In the present embodiment, the racket R is an example of the first object, and the ball is an example of the second object. The example of the first object is not limited to the racket R, and may include another hitting tool in which vibrations are generated due to a collision of the second object, for example, a badminton racket, a table tennis racket, a golf club, a baseball bat, a kendo bamboo sword, a fencing sword or the like. On the other hand, the example of the second object is also not limited to the ball, and may include any type of tool, such as a shuttle used in badminton or a kendo or fencing protector.

Further, the second object may not be a tool, and may include a part of the body of a user such as his or her hand. Therefore, for example, by using the present disclosure, it is possible to evaluate the state of the racket, based on vibrations at the time when the user intentionally hits the racket with his or her hand. For example, in the case where the second object is a hand of a user, the first object will not be limited to a tool of a sport, and may include any type of object in which vibrations are generated and transmitted. For example, for a musical instrument which changes with time such as a woodwind instrument or a stringed instrument, it is possible to analyze vibration characteristics of the musical instrument, and to estimate the state of deterioration change with time, by a user hitting a prescribed position with his or her hand or the like. Other than a musical instrument, the second object may include various types of objects capable of estimating a state due to vibrations being generated.

As described above, in the case where vibrations are generated due to a collision of objects, the present disclosure can be applied to any type of sport, or to an activity other than a sport. Further, in the limitation in which some change is generated in a vibration state of objects, the collision may be made with softer contact. Therefore, it can be said that the present disclosure evaluates a first object, by comparing first vibration characteristics measured beforehand for the first object and second vibration characteristics shown by vibration data generated due to a second object coming into contact with the first object.

The smart phone 200 includes a reception section 210, a processing section 220, a storage section 230, a transmission section 240, an imaging section 250, an input section 260, and an output section 270. The reception section 210 is implemented by a communication apparatus, and receives data transmitted by using wireless communication such as Bluetooth® from the sensor apparatus 100. In addition, the reception section 210 may receive data transmitted from the server 300 by using network communication. The processing section 220 is implemented, for example, by a processor such as a CPU, and processes the received data. For example, the processing section 220 may temporarily accumulate the received data in the storage section 230, and thereafter may transmit the accumulated data to the server 300 via the transmission section 240. Further, the processing section 220 may execute analysis of the received or acquired data. The storage section 230 is implemented, for example, by a memory or storage. The transmission section 240 is implemented by a communication apparatus, and transmits audio data (or data after analysis) to the server 300, for example, by using network communication such as the internet.

The imaging section 250 is implemented, for example, by a camera module which combines an optical system of lenses or the like with an imaging sensor, and acquires images which include a user who is playing tennis as a photographic object. For example, the imaging section 250 continuously provides captured images to the processing section 220 during startup. The processing section 220 causes a display included in the output section 270 to display the provided images as through images, and stores image data in the storage section 230 in the case where imaging of still images or moving images is executed. Note that, in the case where images are not used in an analysis process, which will be described later, the imaging section 250 may not necessarily be included.

The input section 260 accepts an operation input of a user to the smart phone 200. For example, the input section 260 may include an input apparatus such as a touch panel or hardware buttons installed on the display, and may include a microphone for accepting audio of a user as an operation input, or a camera or sensor or the like for accepting gestures of a user as an operation input. The output section 270 outputs various types of information of the user to the smart phone 200. For example, the output section 270 includes a display, a speaker or the like.

The server 300 includes a reception section 310, a processing section 320, a storage section 330, and a transmission section 340. The reception section 310 is implemented by a communication apparatus, and receives data transmitted by using network communication such as the internet from the smart phone 200. The processing section 320 is implemented, for example, by a processor such as a CPU, and processes the received data. For example, the processing section 320 executes an analysis process of the process of the received data, and may additionally accumulate data after analysis in the storage section 330, or may output the data via the transmission section 340. Alternatively, the processing section 320 may only execute a control of the accumulation or output of the data already analyzed in the smart phone 200 or the like.

(2. Functional Configuration)

FIG. 3 is a figure which schematically shows a functional configuration of a processing section of the system according to an embodiment of the present disclosure. With reference to FIG. 3, the processing section includes an input processing section 410, an analysis processing section 420, and an output processing section 430 as a functional configuration. The functional configuration of the processing section may be implemented by being aggregated in a single apparatus in the system 10 described above with reference to FIG. 1, or may be implemented by being distributed to a plurality of apparatuses. More specifically, the input processing section 410, the analysis processing section 420 and the output processing section 430 are implemented by a part or all of the processing sections 120, 220 and 320 of each of the sensor apparatus 100, the smart phone 200 and the server 300. As an example, in the system 10 described with reference to FIG. 1, the input processing section 410 and the analysis processing section 420 may each be implemented by the processing section 320 of the server 300, and the output processing section 430 may be implemented by the processing section 220 of the smart phone 200. Hereinafter, each of the functional configurations will be additionally described.

Response vibration data 413 and a transfer function 417 of the racket are input to the input processing section 410. In the input processing section 410, a modal parameter estimation process 411 from the response vibration data and a modal parameter estimation process 415 from the transfer function are executed, based on this data. Hereinafter, the data and processes of these will be additionally described.

The response vibration data 413 is data generated by detecting vibrations, which are generated in the racket R due to a ball colliding with the racket R, by a sensor mounted on the racket R. Since this vibration data shows vibrations generated as a response of the racket R to a dynamic input such as a collision of a ball, it will be called response vibration data. Since response vibration data for a one time collision of a ball has a time change of a vibration state from the time when a ball collides, is will be represented as a function of time x(t). The vibration data 413 includes response vibration data for a plurality of collisions of a ball, that is, $V=\{x_1(t), x_2(t), \ldots, x_n(t)\}$.

Here, the modal parameter estimation process 411 from response vibration data will be described with reference to FIG. 4. FIG. 4 is a figure for describing a calculation of modal parameters from response vibration data in an embodiment of the present disclosure. With reference to FIG. 4, a time waveform f(t) of an input signal provided to a position of the racket R due to a collision of a ball is transmitted by a transfer function (FRF: Frequency Response Function) G(jw), and is measured as a time waveform x(t) of an output signal in the mounted position of the sensor apparatus 100. This time waveform x(t) corresponds to the above described response vibration data.

In the modal parameter estimation process 411 from the response vibration data, a transfer function set $G_v=\{G_{v1}(jw), G_{v2}(jw), \ldots, G_{vn}(jw)\}$ is estimated from a response vibration data set $V=\{x_1(t), x_2(t), \ldots, x_n(t)\}$, by setting the input signal f(t) as that which is already known. Here, for example, a time waveform measured by reproducing a collision between the racket R and the ball beforehand may be included in the input signal f(t). Further, for example, the input signal f(t) may be approximated by an impulse signal based on the measured time waveform. Further, the input signal f(t) to be used may be selected in accordance with a waveform of a response signal or the like from among a number of signals prepared in advance.

When the transfer function set estimated such as described above is averaged for each frequency, an average transfer function $G_{v\_ave}(jw)$ is obtained. The modal parameters estimated from the average transfer function $G_{v\_ave}(jw)$ are used as second vibration characteristics shown by the vibration data, in a modal parameter comparison process 421 of the analysis processing section 420, such as that described later.

Again with reference to FIG. 3, the transfer function 417 of the racket is a transfer function of the racket R measured beforehand. As described above, the transfer function G(jw) is a function which converts a time waveform f(t) of the input signal, which has been provided to a position of the racket R due to a collision of a ball or the like, into the time waveform x(t) of an output signal in the mounted position of the sensor apparatus 100. Here, the transfer function G(jw) shows specific vibration characteristics in the racket R, regardless of the colliding objects. Therefore, a transfer function set $G=\{G_1(jw), G_2(jw), \ldots, G_n(jw)\}$ can be measured at each position of the racket R, from the time waveform x(t) of an output signal detected by the sensor apparatus 100 at the time when an object (not limited to a ball, and may be a hammer or the like), in which the time waveform f(t) of an input signal is already known, collides at each position of the racket R.

When the transfer function set measured such as described above is averaged for each frequency, an average transfer function $G_{ave}(jw)$ is obtained. The modal parameters estimated from the average transfer function $G_{ave}(jw)$ are used as first vibration characteristics measured beforehand for the racket R, in a modal parameter comparison process 421 of the analysis processing section 420, such as that described later.

The modal parameter comparison process 421 is executed in the analysis processing section 420. In the modal parameter comparison process 421, the modal parameters of the average transfer function $G_{ave}(jw)$ and the modal parameters of the average transfer function $G_{v\_ave}(jw)$, which have been estimated by the modal parameter estimation processes 411 and 415 of the input processing section 410, are compared, and the racket R is evaluated based on a result of the comparison. As described above, in the present embodiment, the modal parameters of the former are first vibration characteristics measured beforehand for the racket R, and the modal parameters of the latter are second vibration characteristics shown by vibration data, in which vibrations generated in the racket R due to a ball colliding with the racket R are detected by a sensor mounted on the racket R.

The modal parameters used in the analysis by the present embodiment are called mode characteristics, and include the three characteristics of natural frequency, mode damping ratio and mode shape. A natural frequency (w) shows the frequency in a peak of the transfer function G(jw). A mode damping ratio (($xi$)) shows a spreading degree of the peak in the natural frequency w of the transfer function G(jw), and is obtained, for example, by a half value method. In the case of a half value method, a mode damping ratio (xi) is expressed by a frequency difference of the positions before and after the peak of the transfer function G(jw) in which the value becomes 1/sqrt(2) of the peak value. A mode shape (($psi$)) is a size (value) in the natural frequency w of the transfer function G(jw).

Here, an evaluation of the racket by a comparison of vibration characteristics will be described with reference to FIG. 5. FIG. 5 is a figure which shows a relation between the natural frequency of a tennis racket and the state of the racket in an embodiment of the present disclosure. In FIG. 5, transfer functions G(jw) are shown overlapping on each position of some tennis racket. In the range of the illustrated frequencies (0-1500 Hz), 1st to 11th natural frequencies w are observed in the transfer functions G(jw).

According to the findings of the present inventors, the peaks of the 1st to 11th natural frequencies are generated by having the racket R vibrate in an elastic mode due to a collision of a ball or the like. In addition, the peaks of the 1st to 4th natural frequencies are generated mainly by vibrations of the frame, and the vibrations of the 5th and higher natural frequencies are mainly generated by vibrations of the gut. However, since the 7th and higher natural frequencies will be a mixture of vibrations of the frame and vibrations of the gut, the peaks in which the vibration of the gut are expressed particularly well will be the peaks of the 5th and 6th natural frequencies.

Therefore, for example, changes or differences of the state of the frame of the racket R can be evaluated, by comparing the 1st to 4th natural frequencies w themselves, and the mode damping ratio (xi) and mode shape (psi) of each of these natural frequencies w. Further, changes or differences of the state of the gut of the racket R can be similarly evaluated, by comparing the 5th and 6th natural frequencies w themselves, and the mode damping ratio (xi) and mode shape (psi) of each of these natural frequencies w.

Note that, a specific example of an evaluation of the racket R by the modal parameter comparison process 421 will be described later. Further, while the first vibration characteristics and the second vibration characteristics of the racket are compared by the modal parameter comparison process 421 in the present embodiment, in another example, the waveform itself or the like of the transfer function G(jw) may be compared, for example, regardless of the modal parameters.

Again with reference to FIG. 3, a notification 431 and/or information 433 is generated and output in the output processing section 430, based on a result of the modal parameter comparison process 421. The notification 431 includes, for example a notification corresponding to the state of the racket R. More specifically, in the case where it is estimated by the modal parameter comparison process 421 that the state of an exchangeable part of the racket R is not good, a notification which recommends an exchange of this part may be generated and output as such a notification. An exchangeable part of the racket R includes, for example, the gut. In this case, in the modal parameter comparison process 421, the degree of looseness of the gut is estimated by a comparison of modal parameters. A notification 431 which recommends an exchange of the gut is generated in the output processing section 430, in accordance with the estimated looseness of the gut.

Further, for example, in the case where it is estimated by the modal parameter comparison process 421 that the state of a non-exchangeable part of the racket R is not good, the notification 431 may include a notification which recommends an exchange of the racket R. While a non-exchangeable part may be different in accordance with how the main body of the racket R is defined, it may include the frame, for example. In this case, in the modal parameter comparison process 421, abnormalities of the frame (cracks, deterioration or the like) are detected by a comparison of the modal parameters. In the case where abnormalities of the frame have been detected, a notification 431 which recommends an exchange of the racket R is generated in the output processing section 430.

Further, for example, the notification 431 may include a notification based on a result which estimates the installation position of the sensor apparatus 100 in the racket R, based on a result of the modal parameter comparison process 421. As described above, the first vibration characteristics used in the comparison in the modal parameter comparison process 421 (modal parameters of the transfer function G(jw) measured beforehand) show a relation between an input signal f(t) provided at each position of the racket R and an output signal x(t) detected by the sensor apparatus 100 mounted at a prescribed position of the racket R. Therefore, if the sensor apparatus 100 is actually mounted at a prescribed position of the racket R, the second vibration characteristics (modal parameters of the transfer function $G_v$(jw) estimated from the response vibration data at the time when a ball collides) will be different to the first vibration characteristics. By using this, in the modal parameter comparison process 421, it can be estimated whether or not the sensor apparatus 100 is installed at a prescribed position of the racket R. For example, in the case where the first vibration characteristics of the racket R measured beforehand, and the second vibration characteristics of the racket R measured from the response vibration data at the time when a ball collides, are different, the output processing section 430 may output a notification 431 which shows that there is the possibility that the installation position of the sensor apparatus 100 is incorrect.

On the other hand, for example, the information 433 may include information which estimates the type of the racket R, based on a result of the modal parameter comparison process 421. As described above, the first vibration characteristics used in the comparison in the modal parameter comparison process 421 (modal parameters of the transfer function G(jw) measured beforehand) are specific vibration characteristics in the racket R. Therefore, if these first vibration characteristics are prepared by performing measurements beforehand for each type of racket, the type of the racket R can be estimated, by judging whether the second vibration characteristics (modal parameters of the transfer function $G_v$(jw) estimated from the response vibration data at the time when a ball collides) match or are similar to the first vibration characteristics for a type of racket. Note that, in the case where first vibration characteristics which match or are similar to the second vibration characteristics do not exist, the output processing section 430 may judge that the racket R is that of an unregistered type, and may output a notification 431 of this fact.

(3. Example of Evaluation of the Hitting Tool Based on Vibration Characteristics)

(3-1. Detection of Loosening of the Gut)

FIG. 6 is a figure for describing a change of vibration characteristics due to differences in the tension of a gut in an embodiment of the present disclosure. Average transfer functions $G_{ave}$(jw) for two cases of changing the tension of the gut upon stringing the same type of gut on the same type of racket are shown in FIG. 6. In the illustrated example, differences d1 and d2 of natural frequencies are generated in regions at which the frequency is higher than 500 Hz. That is, while the vibration modes in regions at which the frequency is lower than 500 Hz will be almost the same regardless of the tension of the gut, a comparatively large gap will occur in the vibration modes in regions at which the frequency is higher than 500 Hz due to differences in the tension of the gut.

Therefore, for example, in the modal parameter comparison process 421, the degree of looseness of the gut can be estimated, by paying attention to the vibration modes in regions at which the frequency is higher than 500 Hz. On the other hand, for example, other than the modal parameter comparison process 421, in the case where a process is executed such as impact position detection of a ball using response vibration data, influences due to the looseness of the gut can be removed and a process can be executed, by paying attention to the waveform or the like of the transfer function G(jw) in regions at which the frequency is lower than 500 Hz.

Note that, while 500 Hz is shown in the example illustrated in FIG. 6 as a borderline of the frequency, in the case where the type of racket or gut is different, for example, a different frequency may become a borderline. Specifically, there may be cases in which a gap occurs in vibration modes due to differences in the tension of the gut in regions lower than 500 Hz, and there may be cases in which influences of the tension of the gut do not appear in vibration modes in regions higher than 500 Hz.

FIG. 7 is a figure which shows an example of a change of vibration characteristics due to differences in the tension of the gut in an embodiment of the present disclosure. Transfer functions G(jw) measured at the time when a same input signal has been provided to a same position, where the gut has been stringed for a same type of racket, are shown in FIG. 7 for each of a polyester, multifilament and natural type gut. Transfer functions G(jw) are measured for each of the cases of the tension of the gut being 40 pounds, 50 pounds and 60 pounds.

As a result of this, as illustrated in the figure, natural frequencies shown by the transfer functions G(jw) become high in regions at which they are larger than approximately 500 Hz in proportion to the tension of the gut, even for guts of any type. For example, changes in the transfer functions G(jw) due to tension can be retained for each type of gut such as that illustrated, and the tension of the gut can be estimated, by judging which natural frequency of the tension is closest to the natural frequency of the transfer function $G_v$(jw) measured from the response vibration data.

FIG. 8 is a flow chart which shows an example of a process for a gut replacement recommendation notification in an embodiment of the present disclosure. First, the modal parameter estimation process 411 from response vibration data is executed in the input processing section 410. At this time, the response vibration data is classified into each acquisition date (S101), and modal parameters are estimated for each date (S103). In this example, in the case where a change of the generated state of the racket is evaluated along with the passage of time, the response vibration data may be classified into units such as days or weeks, and it may be effective to detect changes in a time series.

Next, the modal parameter comparison process 421 is executed in the analysis processing section 420. Here, first, a natural frequency $w_1$, which shows changes in the tension of the gut, is acquired from the modal parameters of each date (S105). For example, the natural frequency $w_1$ may be the smallest natural frequency w in which an influence can be noticeably seen in the change of tension of the gut in the examples shown in FIG. 6 and FIG. 7. More specifically, according to the example of FIG. 6, the natural frequency $w_1$ may be the first natural frequency w larger than 500 Hz.

Next, it is judged whether or not the natural frequency $w_1$ has sufficiently decreased (S107). Here, for example, a decrease in the natural frequency $w_1$ may be judged based on the natural frequency of the transfer function G(jw) (first vibration characteristics) measured at a state in which the gut has been stringed at a prescribed tension, or may be determined based on the natural frequency of the transfer function G(jw) estimated based on older data, from among the response vibration data classified into a time series such as that described above. In the case where it is judged that the natural frequency $w_1$ has sufficiently decreased, a notification 431 which recommends replacement of the gut is output to a user (player) by the output processing section 430 (S109).

FIG. 9 is a figure which shows an example of a change of natural frequency in accordance with a tension change of the gut in an embodiment of the present embodiment. In the illustrated example, the natural frequency $w_1$ shown in the above described example of FIG. 8 gradually decreases from 550 Hz at the time of a gut replacement, and becomes 450 Hz at the time of a replacement recommendation. In the illustrated example, the tension of the gut will stabilize at the time when the natural frequency $w_1$ becomes 450 Hz, and accordingly the natural frequency $w_1$ will not change much. However, this state is lower compared to the time of a replacement of the gut, and will not necessarily be a state desirable for play. Accordingly, in the present disclosure, a change of the tension of the gut is detected based on the vibration characteristics of the racket R, at the time when the natural frequency $w_1$ has sufficiently decreased (at the time when it has become 450 Hz such as in FIG. 9), and a notification which recommends replacement is output.

(3-2. Detection of Failure of the Racket)

FIG. 10 is a flow chart which shows an example of a process for a failure possibility notification of the racket in an embodiment of the present disclosure. First, the modal parameter estimation process 411 from response vibration data is executed in the input processing section 410. At this time, the response vibration data is classified into each acquisition date (S201), and modal parameters are estimated for each date (S203). Similar to the above described example of a gut replacement notification, in the case where a change of the generated state of the racket is evaluated along with the passage of time, the response vibration data may be classified into units such as days or weeks, and it may be effective to detect changes in a time series.

Next, the modal parameter comparison process 421 is executed in the analysis processing section 420. Here, the modal parameters of each date are compared to the modal parameters of the transfer function G(jw) measured beforehand (S205). In addition, as a result of comparison, it is judged whether or not there is a date having significantly different modal parameters (S207). In the case where there is a date having significantly different modal parameters, a notification 431 which shows a failure possibility of the racket is output by the output processing section 430 (S209).

Note that, since the portion assumed to have the occurrence of a failure is not specified in the illustrated example, a comparison is performed for the entire modal parameters, without being limited to any of the natural frequencies or the like. In the case where a failure, for example, cracks, deterioration or the like, occurs at some portion of the racket, the transfer characteristics of vibration will change at this portion, and therefore some change will occur in the modal parameters which include the natural frequencies. Therefore, by comparing the entire modal parameters with those measured beforehand, it can be detected that some failure has occurred in the racket. For example, in the case where an exchangeable part in the racket is the gut and the other parts are non-exchangeable parts, an exchange of the racket will be recommended to a user by a notification of this case.

Alternatively, in the above described S205, specific modal parameters, for example, natural frequencies, may become the target of comparison. For example, in the case where a portion assumed to have the occurrence of a failure is specified, and it is understood how the modal parameters change in the case where this portion has failed, a notification 431 which also includes the portion of the failure may be output in S209, by comparing the specified modal parameters. Also in this case, if the part which includes this portion is non-exchangeable, an exchange of the racket will be recommended to a user by the notification. Further, if the part which includes this portion is exchangeable, an exchange of the part will be recommended to a user by the notification.

While there are cases in which a failure of the racket suddenly occurs, there will also be cases in which a failure of the racket gradually occurs while a player is unaware. In the case of gradually occurring, a player will continue to use the racket every day, and therefore it will be difficult to be aware of the failure of the racket, and the performance of the racket will surely decrease. In the present embodiment, a notification is output at the time when a decrease in performance exceeds a threshold, by a comparison of the modal parameters. Therefore, a player can be prevented from continuing to play with a racket which has a decrease in performance.

(3-3. Detection of the Type of Racket)

FIG. 11 is a figure for describing a detection of the type of racket in an embodiment of the present disclosure. Average transfer functions $G_{ave}$(jw) of each of five different types of rackets are shown in FIG. 11. In the illustrated example, a difference d3 of natural frequencies, which become the peaks of each of the transfer functions, occurs in a region at which the frequency is lower than 500 Hz. In this way, specific features can be seen for each type of racket in vibration characteristics such as the transfer functions G(jw) of the rackets.

FIG. 12 is a figure which shows an example of information presentation using the detection of the type of racket in an embodiment of the present disclosure. A graph on which similar points of different types of rackets are mapped onto two-dimensional coordinates, with an FRF (transfer function) as an input, is shown in FIG. 12. As described above, since specific features can be seen for each type of racket in vibration characteristics measured beforehand for the racket, or in vibration characteristics extracted from response vibration data, by storing beforehand such vibration characteristics (first vibration characteristics), for example, for each type of racket, the type of racket can be estimated, and it can be determined whether or not the characteristics of each racket are similar.

By using a detection of the type of racket such as that described above, for example, a new racket can be recommended which has characteristics similar to the characteristics of the racket used by a player, a racket can be specified without settings by player operations in the case where the sensor apparatus 100 is newly mounted on a racket different to that used up until now by a player, or a similar racket can be presented as a candidate for an exchange in the case where a failure of the racket has been detected. Further, for example, if there are differences between rackets, a player can detect whether the sensor apparatus 100 has not been mounted on the racket by mistake (for example, a racket of a friend playing against the player).

(4. Hardware Configurations)

Next, examples of hardware configurations for implementing the sensor apparatus and the analysis apparatus (in the above described examples, the sensor apparatus, the smart phone or the server) according to an embodiment of the present disclosure will be described with reference to FIG. 13 and FIG. 14.

(Sensor Apparatus)

FIG. 13 is a figure which shows an example of a hardware configuration of the sensor apparatus according to an embodiment of the present disclosure. With reference to FIG. 13, the sensor apparatus 100 may include a sensor 101, a Central Processing Unit (CPU) 103, a Read Only Memory (ROM) 105, a Random Access Memory (RAM) 107, a user interface 109, an external storage apparatus 111, a communication apparatus 113, and an output apparatus 115. These elements are mutually connected by a bus, for example.

For example, the sensor 101 includes an acceleration sensor, an angular velocity sensor, a vibration sensor, a magnetic field sensor, a temperature sensor, a pressure sensor (including a press switch), a Global Positioning System (GPS) receiver or the like. The sensor 101 may include a camera (imaging sensor) or a microphone (audio sensor).

The CPU 103, the ROM 105 and the RAM 107 implement various types of functions with software, by reading and executing program instructions, for example, recorded in the external storage apparatus 111. In the embodiments of the present disclosure, functions such as control of the entire sensor apparatus 100 may be implemented, for example, by the CPU 103, the ROM 105 and the RAM 107.

The user interface 109 is, for example, an input apparatus such as buttons or a touch panel, which receives user operations of the sensor apparatus 100. For example, operations of a user may instruct the start or completion of the transmission of sensor information from the sensor apparatus.

The external storage apparatus 111 stores various types of information related to the sensor apparatus 100. For example, program instructions for causing functions to be implemented by software in the CPU 103, the ROM 105 and RAM 107 may be stored in the external storage apparatus 111, or data acquired by the sensor 101 may be cached temporarily. When considering that the sensor apparatus 100 is mounted in a hitting tool or the like, it is desirable to use a sensor apparatus, for example, with a strong impact such as a semiconductor memory, as the external storage apparatus 111.

The communication apparatus 113 communicates with the analysis apparatus 600, which will be described later, by various types of wired or wireless communication systems. Further, the communication apparatus 113 may directly communicate with the analysis apparatus 600 by inter-device communication, or may communicate with the analysis apparatus 600 via a network such as the internet.

The output apparatus 115 is constituted by an apparatus capable of outputting information as light, audio or images. For example, the output apparatus 115 may output information which notifies detection of a time or play event in the sensor apparatus 100, or may output a visual or aural notification to a user, based on an analysis result received from the analysis apparatus 600 or an analysis result calculated in the sensor apparatus 100. For example, the output apparatus 115 includes, for example, a display such as a lamp of an LED or the like or an LCD, a speaker, a vibrator or the like.

(Analysis Apparatus)

FIG. 14 is a figure which shows an example of a hardware configuration of the analysis apparatus according to an embodiment of the present disclosure. The analysis apparatus 600 may implement, for example, the analysis apparatus according to an embodiment of the present disclosure, or the smart phone 200 or the server 300 described above. Note that, as described above, the analysis apparatus may be implemented by the sensor apparatus 100.

The analysis apparatus 600 may include a CPU 601, a ROM 603, a RAM 605, a user interface 609, an external storage apparatus 611, a communication apparatus 613, and an output apparatus 615. These elements are mutually connected by a bus, for example.

The CPU 601, the ROM 603 and the RAM 605 implement various types of functions with software, by reading and executing program instructions, for example, recorded in the external storage apparatus 611. In the embodiments of the present disclosure, control of the entire analysis apparatus 600, functions of the processing section in the above described functional configuration or the like, may be implemented, for example, by the CPU 601, the ROM 603 and the RAM 605.

The user interface 609 is, for example, an input apparatus such as buttons or a touch panel, which receives user operations of the analysis apparatus 600.

The external storage apparatus 611 stores various types of information related to the analysis apparatus 600. For example, program instructions for causing functions to be implemented by software in the CPU 601, the ROM 603 and RAM 605 may be stored in the external storage apparatus 611, or sensor information received by the communication apparatus 613 may be cached temporarily. Further, a log of analysis results may be accumulated in the external storage apparatus 611.

The output apparatus 615 is constituted by an apparatus capable of visually or aurally notifying information to a user. For example, the output apparatus 615 may be a display device such as a Liquid Crystal Display (LCD), or an audio output device such as a speaker or headphones. The output apparatus 615 outputs a result obtained by the processes of the analysis apparatus 600 as video images such as text or pictures, or outputs the results as audio such as voices or sounds.

Heretofore, examples of the hardware configurations of the sensor apparatus 100 and the analysis apparatus 600 have been shown. Each of the above described constituent elements may be constituted by using generic members, or may be constituted by hardware specialized for the functions of each of the constituent elements. Such a configuration may be appropriately changed in accordance with the technology level at the time of implementation.

(5. Conclusion)

For example, the embodiments of the present disclosure may include an analysis apparatus such as that described above (an information processing terminal such as a smart phone, a server, or a sensor apparatus), a system, an information processing method executed by the analysis apparatus or the system, a program for causing the analysis apparatus to function, and a non-temporarily tangible medium on which programs are recorded.

It should be understood by those skilled in the art that various modifications, combinations, sub-combinations and alterations may occur depending on design requirements and other factors insofar as they are within the scope of the appended claims or the equivalents thereof.

Further, the effect described in the present disclosure is not limited to that specified or illustrated. That is, the technology according to the present disclosure may accomplish other effects obvious to a person skilled in the art from the description of the present disclosure, along with the above described effect or instead of the above described effect.

Additionally, the present technology may also be configured as below.

(1) A system to analyze vibration data, comprising: circuitry configured to receive the vibration data generated by a sensor that senses vibration of an object, analyze the vibration data based on stored predetermined vibration data, and determine a characteristic of the object based on the analysis.

(2) The system according to (1), wherein the sensor communicates the vibration data from the vibration of the object to the circuitry via wireless communication.

(3) The system according to (2), wherein the sensor is attached to the object.

(4) The system according to (3), wherein the circuitry is further configured to estimate an attachment position of the sensor on the object.

(5) The system according to (4), wherein the circuitry is further configured to estimate whether or not the sensor is attached at a prescribed position.

(6) The system according to any one of (1) to (5), wherein the object is a tennis racket, and the vibration of the object is cause by the tennis racket striking a ball.

(7) The system according to any one of (1) to (6), wherein the circuitry determines modal parameters for the object based on the vibration data and a transfer function of the object.

(8) The system according to (7), wherein the stored predetermined vibration data includes predetermined modal parameters for the object, and the circuitry compares the predetermined modal parameters to the determined modal parameters in order to determine the characteristic of the object.

(9) The system according to any one of (7) to (8), wherein the modal parameters include a natural frequency, a damping ratio and a mode shape.

(10) The system according to any one of (6) to (9), wherein natural frequencies of the tennis racket determined from the vibration data are compared to natural frequencies included in the predetermined vibration data to determine a state of the tennis racket.

(11) The system according to (10), wherein a first subset of the natural frequencies correspond to vibration of a frame of the tennis racket, and second subset of the natural frequencies correspond to vibration of the gut strings of the tennis racket, and the circuitry determines a state of the frame of the tennis racket by analyzing the first subset of natural frequencies, and determines a state of the gut strings by analyzing the second subset of natural frequencies.

(12) The system according to (11), wherein the circuitry generates a notification that the gut strings require replacement based on the analysis of the second subset of natural frequencies.

(13) The system according to (12), wherein the circuitry generates the notification that the gut strings require replacement when analysis of the second subset of natural frequencies indicates that the frequencies of the second subset of natural frequencies have shifted lower that corresponding natural frequencies in the predetermined vibration data.

(14) The system according to (13), wherein a lowering in frequency of the second subset of natural frequencies with respect to the corresponding frequencies in the predetermined vibration data indicates a loosening of tension in the gut strings.

(15) The system according to any one of (11) to (14), wherein the circuitry generates a notification that the frame of the tennis racket require replacement based on the analysis of the first subset of natural frequencies.

(16) The system according to (15), wherein the circuitry generates the notification that the frame of the tennis racket requires replacement when analysis of the first subset of natural frequencies indicates that the frequencies of the first subset of natural frequencies have shifted lower that corresponding natural frequencies in the predetermined vibration data.

(17) The system according to any one of (6) to (16), wherein the natural frequencies if the tennis racket are analyzed by the circuit to determine a type of the tennis racket.

(18) The system according to any one of (1) to (17), wherein the sensor includes at least one of an angular velocity sensor, an acceleration sensor, a magnetic field sensor, a camera or a microphone.

(19) The system according to any one of (1) to (18), wherein the circuitry is a smartphone and the analysis of the vibration data and the determination of the characteristic is performed on the smartphone.

(20) The system according to any one of (1) to (19), wherein the circuitry includes a smartphone to communicate the vibration data to a server where analysis of the vibration data and determination of the characteristic is performed.

(21) A method of analyzing vibration data, comprising: receiving the vibration data generated by a sensor that senses vibration of an object; analyzing, with circuitry, the vibration data based on stored predetermined vibration data; and determining, with the circuitry, a characteristic of the object based on the analysis.

(22) A non-transitory computer-readable medium encoded with computer-readable instructions thereon, the computer-readable instructions when executed by a computer cause the computer to perform a method comprising: receiving the vibration data generated by a sensor that senses vibration of an object; analyzing the vibration data based on stored predetermined vibration data; and determining a characteristic of the object based on the analysis.

(A01) An analysis apparatus, including:
a vibration data acquisition section which acquires vibration data in which vibrations generated in a first object due to a second object colliding with the first object are detected by a sensor mounted on the first object; and
an evaluation section which evaluates the first object by comparing first vibration characteristics measured beforehand for the first object and second vibration characteristics shown by the vibration data.

(A02) The analysis apparatus according to (A01),
wherein the first object includes a hitting tool, and
wherein the evaluation section estimates a type of the hitting tool based on the first vibration characteristics stored beforehand for each type of the hitting tool.

(A03) The analysis apparatus according to (A01) or (A02),
wherein the first object includes a hitting tool, and
wherein the evaluation section estimates a state of the hitting tool.

(A04) The analysis apparatus according to (A03), further including:

a notification section which generates a notification corresponding to the state of the hitting tool.

(A05) The analysis apparatus according to (A04),
wherein the evaluation section estimates a state of an exchangeable first part of the hitting tool, and
wherein the notification section generates a notification which recommends an exchange of the first part based on a result of the estimation.

(A06) The analysis apparatus according to (A05),
wherein the hitting tool includes a racket,
wherein the first part includes a gut stringed onto the racket,
wherein the evaluation section estimates a looseness of the gut, and
wherein the notification section generates a notification which recommends an exchange of the gut in accordance with the looseness of the gut.

(A07) The analysis apparatus according to any one of (A04) to (A06),
wherein the evaluation section estimates a state of a non-exchangeable second part of the hitting tool, and
wherein the notification section generates a notification which recommends an exchange of the hitting tool based on a result of the estimation.

(A08) The analysis apparatus according to any one of (A01) to (A07),
wherein the evaluation section estimates an installation position of the sensor on the first object.

(A09) The analysis apparatus according to any one of (A01) to (A08),
wherein the evaluation section compares transfer functions included in each of the first vibration characteristics and the second vibration characteristics.

(A10) The analysis apparatus according to (A09),
wherein the evaluation section compares modal parameters extracted from the transfer functions.

(A11) The analysis apparatus according to (A10),
wherein the evaluation section compares natural frequencies included in the modal parameters.

(A12) A non-transitory computer-readable recording medium having a program recorded thereon, the program causing a computer to function as:
acquiring vibration data in which vibrations generated in a first object due to a second object colliding with the first object are detected by a sensor mounted on the first object; and
evaluating the first object by comparing first vibration characteristics measured beforehand for the first object and second vibration characteristics shown by the vibration data.

(A13) An analysis method, including:
acquiring vibration data in which vibrations generated in a first object due to a second object colliding with the first object are detected by a sensor mounted on the first object; and
evaluating, by a processor, the first object by comparing first vibration characteristics measured beforehand for the first object and second vibration characteristics shown by the vibration data.

REFERENCE SIGNS LIST 10 system
100 sensor apparatus
200 smart phone
300 server
410 input processing section
411 modal parameter estimation process from response vibration data
413 response vibration data
415 modal parameter estimation process from transfer function
417 transfer function of racket
420 analysis processing section
421 modal parameter comparison process
430 output processing section
431 notification
433 information

The invention claimed is:

1. A system to analyze vibration data, comprising:
a sensor located in or on sporting equipment, the sensor configured to sense vibration of the sporting equipment due to impact with another object;
circuitry configured to
receive the vibration data generated by the sensor,
analyze the vibration data based on received predetermined vibration data including first natural frequencies corresponding to a vibration of a first part of the sporting equipment that impacts with the another object and second natural frequencies corresponding to a vibration of a second part of the sporting equipment that does not impact with the another object,
determine that one of a replacement of an entirety of the sporting equipment and a replacement of only a portion of the sporting equipment is notified based on a change of an analysis result of the first natural frequencies and the second natural frequencies,
determine modal parameters for the sporting equipment based on the vibration data and a transfer function of the sporting equipment,
determine that the one of the replacement of the entirety of the sporting equipment and the replacement of only a portion of the sporting equipment is notified when a decrease in performance exceeds a threshold based on a comparison of the modal parameters with the vibration data,
when the replacement is notified, identify a particular new sporting equipment that is recommended as a replacement and which has characteristics similar to the characteristics of the sporting equipment based on a plurality of different natural frequencies included in the second natural frequencies of the vibration data of the sporting equipment,
determine the modal parameters for the sporting equipment for each of a plurality of different dates, group the modal parameters and associated dates by days and by weeks, and determine that replacement of at least the portion of the sporting equipment is required based on a passage of time indicated by the determined modal parameters and associated dates grouped by days and by weeks, and
compare the modal parameters of each date to transfer function modal parameters of a transfer function measured beforehand, and notify the possibility of a failure in a case that there is a date for which the comparison indicates a difference between the modal parameters and the transfer function modal parameters exceeds a predetermined threshold.

2. The system according to claim 1, wherein the sensor communicates the vibration data from the vibration of the sporting equipment to the circuitry via wireless communication.

3. The system according to claim 2, wherein the sensor is attached to the sporting equipment.

4. The system according to claim 3, wherein the circuitry is further configured to estimate an attachment position of the sensor on the sporting equipment.

5. The system according to claim 4, wherein the circuitry is further configured to estimate whether or not the sensor is attached at a prescribed position.

6. The system according to claim 1, wherein the sporting equipment is a tennis racket, and the vibration of the sporting equipment is caused by the tennis racket striking a ball.

7. The system according to claim 1, wherein the circuitry determines modal parameters for the sporting equipment based on the vibration data and a transfer function of the sporting equipment.

8. The system according to claim 7, wherein the received predetermined vibration data includes predetermined modal parameters for the sporting equipment, and the circuitry compares the predetermined modal parameters to the determined modal parameters in order to determine the impact position on the sporting equipment.

9. The system according to claim 7, wherein the modal parameters include a natural frequency, a damping ratio and a mode shape.

10. The system according to claim 6, wherein natural frequencies of the tennis racket determined from the vibration data are compared to natural frequencies included in the predetermined vibration data to determine a state of the tennis racket.

11. The system according to claim 10, wherein a first subset of the natural frequencies correspond to vibration of a frame of the tennis racket, and second subset of the natural frequencies correspond to vibration of the gut strings of the tennis racket, and the circuitry determines a state of the frame of the tennis racket by analyzing the first subset of natural frequencies, and determines a state of the gut strings by analyzing the second subset of natural frequencies.

12. The system according to claim 11, wherein the circuitry generates a notification that the gut strings require replacement based on the analysis of the second subset of natural frequencies.

13. The system according to claim 12, wherein the circuitry generates the notification that the gut strings require replacement when analysis of the second subset of natural frequencies indicates that the frequencies of the second subset of natural frequencies have shifted lower than corresponding natural frequencies in the predetermined vibration data.

14. The system according to claim 13, wherein a lowering in frequency of the second subset of natural frequencies with respect to the corresponding frequencies in the predetermined vibration data indicates a loosening of tension in the gut strings.

15. The system according to claim 11, wherein the circuitry generates a notification that the frame of the tennis racket require replacement based on the analysis of the first subset of natural frequencies.

16. The system according to claim 15, wherein the circuitry generates the notification that the frame of the tennis racket requires replacement when analysis of the first subset of natural frequencies indicates that the frequencies of the first subset of natural frequencies have shifted lower than corresponding natural frequencies in the predetermined vibration data.

17. The system according to claim 1, wherein the sensor includes at least one of an angular velocity sensor, an acceleration sensor, a magnetic field sensor, a camera or a microphone.

18. The system according to claim 1, wherein the circuitry is a smartphone and the analysis of the vibration data, the determination of the impact position, the performance of the comparison of the vibration data, and the controlling the display of the comparison are performed on the smartphone.

19. The system according to claim 1, wherein the circuitry includes a smartphone to communicate the vibration data to a server where analysis of the vibration data, determination of the impact position, the performance of the comparison of the vibration data, and the controlling the display of the comparison are performed.

20. A method of analyzing vibration data, comprising:
sensing, by a sensor located in or on sporting equipment, vibration of the sporting equipment due to impact with another object;
receiving the vibration data generated by the sensor;
analyzing, with circuitry, the vibration data based on received predetermined vibration data including first natural frequencies corresponding to a vibration of a first part of the sporting equipment that impacts with the another object and second natural frequencies corresponding to a vibration of a second part of the sporting equipment that does not impact with the another object;
determining that one of a replacement of an entirety of the sporting equipment and a replacement of only a portion of the sporting equipment is notified based on a change of an analysis result of the first natural frequencies and the second natural frequencies; and
identifying a particular new sporting equipment that is recommended as a replacement and which has characteristics similar to the characteristics of the sporting equipment based on a plurality of different natural frequencies included in the second natural frequencies of the vibration data of the sporting equipment.

21. A non-transitory computer-readable medium encoded with computer-readable instructions thereon, the computer-readable instructions when executed by a computer cause the computer to perform a method comprising:
sensing, by a sensor located in or on sporting equipment, vibration of the sporting equipment due to impact with another object;
receiving the vibration data generated by the sensor;
analyzing the vibration data based on received predetermined vibration data including first natural frequencies corresponding to a vibration of a first part of the sporting equipment that impacts with the another object and second natural frequencies corresponding to a vibration of a second part of the sporting equipment that does not impact with the another object;
determining that one of a replacement of an entirety of the sporting equipment and a replacement of only a portion of the sporting equipment is notified based on a change of an analysis result of the first natural frequencies and the second natural frequencies; and
identifying a particular new sporting equipment that is recommended as a replacement and which has characteristics similar to the characteristics of the sporting equipment based on a plurality of different natural frequencies included in the second natural frequencies of the vibration data of the sporting equipment.

* * * * *